(12) United States Patent
Camosi et al.

(10) Patent No.: US 12,246,557 B2
(45) Date of Patent: Mar. 11, 2025

(54) METHOD FOR CONTROLLING THE ROLLING RESISTANCE OF A RUNNING TYRE AND METHOD FOR REDUCING THE CONSUMPTION OF A RUNNING VEHICLE

(71) Applicant: PIRELLI TYRE S.P.A., Milan (IT)

(72) Inventors: Luca Camosi, Milan (IT); Davide Miazzo, Milan (IT); Ilaria Ghezzi, Rome (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 18/714,076

(22) PCT Filed: Dec. 16, 2022

(86) PCT No.: PCT/IB2022/062353
§ 371 (c)(1),
(2) Date: May 28, 2024

(87) PCT Pub. No.: WO2023/119088
PCT Pub. Date: Jun. 29, 2023

(65) Prior Publication Data
US 2025/0026154 A1    Jan. 23, 2025

(30) Foreign Application Priority Data
Dec. 20, 2021 (IT) .................. 102021000031853

(51) Int. Cl.
*B60C 11/03* (2006.01)
(52) U.S. Cl.
CPC ... *B60C 11/0304* (2013.01); *B60C 2011/0353* (2013.01)

(58) Field of Classification Search
CPC .................. B60C 2011/0353; B60C 11/0304
See application file for complete search history.

(56) References Cited

U.S. PATENT DOCUMENTS

| | | | |
|---|---|---|---|
| 4,573,511 A | 3/1986 | Kabe et al. | |
| 10,457,099 B2 | 10/2019 | Losi | |

FOREIGN PATENT DOCUMENTS

| | | | |
|---|---|---|---|
| JP | S57114704 A | 7/1982 | |
| JP | H0692104 A | 4/1994 | |

(Continued)

OTHER PUBLICATIONS

International Preliminary Report on Patentability issued for International PCT Application No. PCT/IB2022/062353 filed on Dec. 16, 2022 on behalf of Pirelli Tyre S.P.A. Mail Date: Jan. 19, 2024. 8 pages.

(Continued)

*Primary Examiner* — Moshe Wilensky
(74) *Attorney, Agent, or Firm* — Steinfl + Bruno LLP

(57) ABSTRACT

A method for controlling the rolling resistance of a running tyre includes: manufacturing a tyre, installing the tyre on a rim, mounting a wheel on a vehicle. The tyre is manufactured by obtaining an external profile of the tyre that is asymmetric with respect to a middle line plane of the tyre and configured to generate, between the tyre rotating in rectilinear running and the ground, a lateral conicity force, conferring to the tyre the asymmetric external profile. The asymmetric external profile is obtained so as to control a resulting lateral force exchanged between the ground and the tyre and to limit a rolling resistance of the tyre running on rectilinear trajectory.

8 Claims, 7 Drawing Sheets

(56) References Cited

FOREIGN PATENT DOCUMENTS

| JP | 2012171433 A | 9/2012 |
| WO | 2008/078431 A1 | 7/2008 |
| WO | 2013/190419 A1 | 12/2013 |
| WO | 2020/005285 A1 | 1/2020 |

OTHER PUBLICATIONS

International Search Report and Written Opinion issued for International PCT Application No. PCT/IB2022/062353 filed on Dec. 16, 2022 on behalf of Pirelli Tyre S.P.A. Mail Date: Mar. 21, 2023. 12 pages.

FIG.5
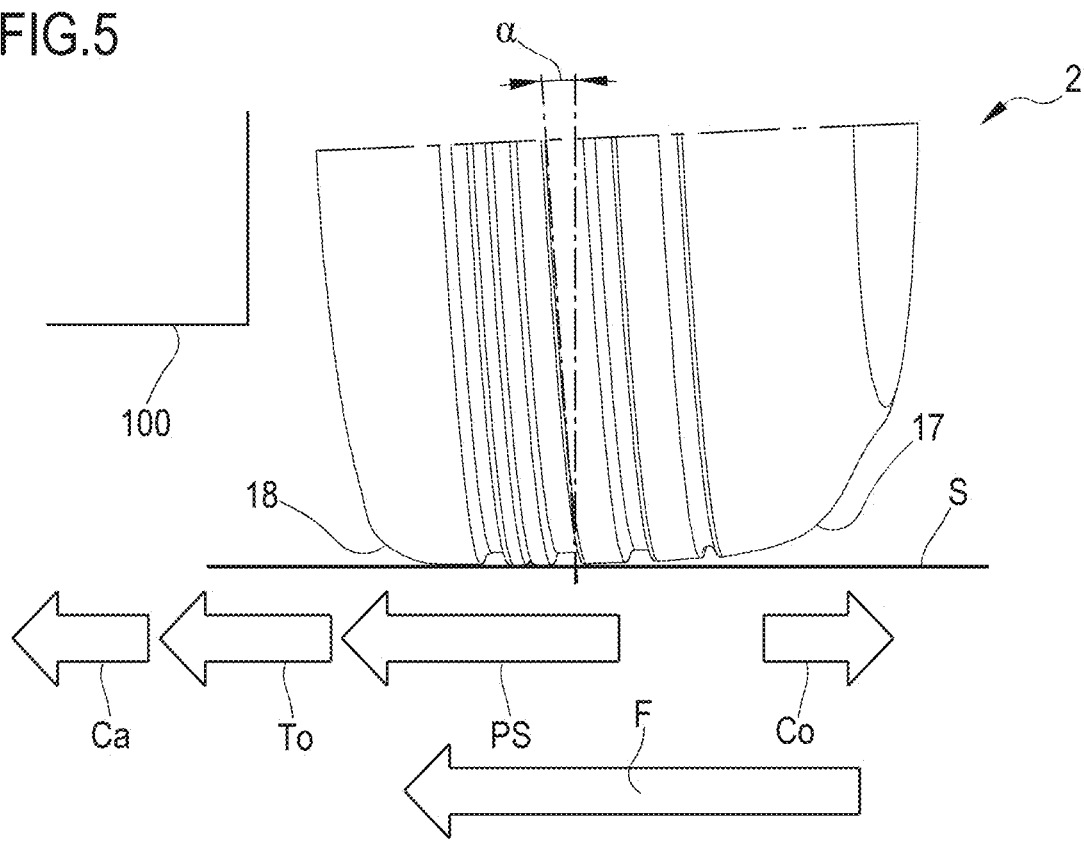
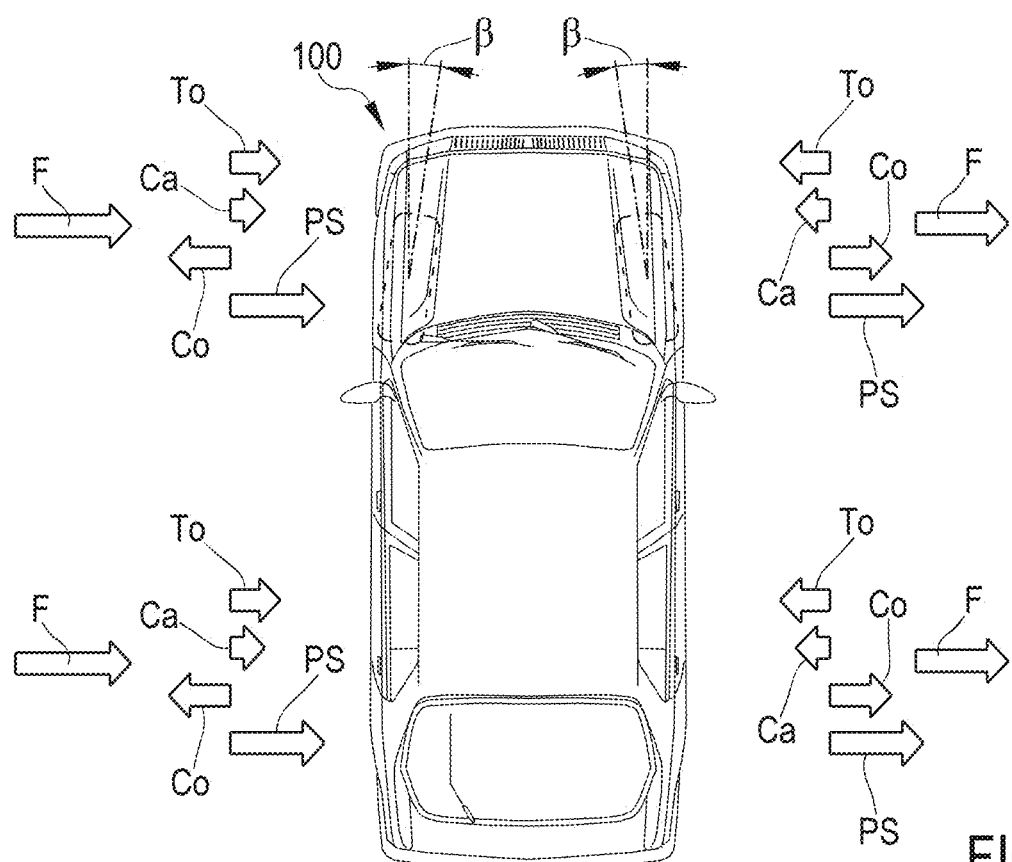
FIG.6

METHOD FOR CONTROLLING THE ROLLING RESISTANCE OF A RUNNING TYRE AND METHOD FOR REDUCING THE CONSUMPTION OF A RUNNING VEHICLE

CROSS REFERENCE TO RELATED APPLICATIONS

The present application is the U.S. national stage of International Application No. PCT/IB2022/062353 filed on Dec. 16, 2022, which, in turn, claims priority to Italian Patent Application No. 102021000031853 filed on Dec. 20, 2021.

TECHNICAL FIELD OF THE INVENTION

The present invention regards a method for controlling the rolling resistance of a running tyre, a method for reducing the consumption of a running vehicle, a tyre for vehicle wheels and an apparatus for vulcanising and moulding tyres for vehicle wheels. Preferably but not exclusively, the present invention refers to road tyres intended to equip hybrid or electric cars.

State of the Art

A tyre for vehicle wheels generally comprises a carcass structure associated with a belt structure. In radially outer position with respect to the belt structure, a tread band is arranged. The tread is the portion of the tyre that enters into direct contact with the road surface and exchanges the forces therewith that allow conducting the car along the trajectories set by the pilot.

The production cycles of a tyre provide for a process for building green tyres in which the various structural components of the tyre itself are manufactured and/or assembled, for example on one or more drums. The built green tyres are transferred into a moulding and vulcanisation line where a moulding and vulcanisation process is actuated adapted to define the structure of the tyre according to a desired geometry and tread design.

The document WO2013190419, in the name of the same Applicant, illustrates a method for controlling the symmetry of the footprint area of a running tyre on rectilinear trajectory with non-zero camber angle by arranging, substantially parallel to the ground, any one median line of the tread band placed at the abovementioned footprint area. Such document also illustrates a tyre and to a wheel for vehicles in which, in each radial half-section, a corresponding median line of the tread band and the rotation axis of the tyre form a predefined angle substantially equal in absolute value to the camber angle. The same document also illustrates a process for manufacturing tyres for vehicle wheels, in which a green tyre whose transverse section is characterised by a symmetric external profile is deformed during the moulding and vulcanisation step up to forming a predefined non-zero angle between any one median line of the tread band and the rotation axis of the vulcanised tyre.

The document WO2020005285A1 illustrates tyres mounted on a vehicle and capable of generating lateral ply steer forces such to reduce the wear of the tyres during the rectilinear running of the vehicle.

The document JP2012171433A illustrates a tyre provided with an asymmetric external profile capable of generating a lateral conicity force and a lateral ply steer force which cancel each other out, allowing the limitation of the rolling resistance.

Also the document JPH0692104A illustrates an asymmetric tyre for which the ply steer force and the conicity force cancel each other out.

The document WO2008078431A1 illustrates a run flat tyre mounted with a camber angle and provided with reinforcements such to reduce the deformation during running following puncture.

The documents JPS57114704A and U.S. Pat. No. 4,573,511A both illustrate a tyre with a structure such to reduce the ply steer force generated by the belt layers.

The document U.S. Pat. No. 10,457,099B2 illustrates a tyre with asymmetric profile capable of controlling the symmetry of the footprint area.

Definitions

The terms "radial", "axial" and "circumferential" refer to a rotation axis of a tyre or a central axis of a vulcanisation and moulding cavity. When the tyre is in the vulcanisation and moulding cavity, said rotation axis and central axis coincide.

By "radial plane" it is intended a plane in which the rotation axis of the tyre lies or a plane in which the central axis of the vulcanisation and moulding cavity lies.

By "external profile of a tyre" it is intended a section according to a radial plane of a radially outer surface of said tyre.

By "curvature radius" of a curve it is intended the radius of the osculating circle at one point of the curve.

By "curvature" it is intended the reciprocal of the radius of the osculating circle at one point, where the osculating circle is the circle which approximates a curve around such point of the curve.

By "internal profile of a vulcanisation and moulding cavity" it is intended a section according to a radial plane of a radially inner surface of said vulcanisation and moulding cavity.

With the verb "controlling" it is intended the possibility to verify and/or set, beforehand, resultant of lateral forces that act between the tyre and the road through the generation of an additional lateral force.

SUMMARY

The Applicant has observed that, during the rectilinear running of a vehicle, lateral or transverse forces—i.e. directed perpendicular with respect to an advancement direction of the vehicle—are generated between each of the tyres of the vehicle and the road surface, due to various factors such as for example forces due to asymmetries of the internal structure of the tyre, forces due to a toe angle of the tyre, forces due to a camber angle of the tyre.

The Applicant has observed that such lateral forces have effect on the rolling resistance, in the sense that given the same other influencing factors, the rolling resistance increases with the increase of the resultant of such lateral forces.

In such context, the Applicant has set as objective that of controlling the resistance to advancement of the vehicle, due to the interaction between the tyres and the ground, which is strictly correlated to the rolling resistance.

The Applicant has set as objective that of reducing the consumption or increasing the autonomy of the vehicle.

The Applicant has set as objective that of reducing the overheating of the tyres during running.

The Applicant has also set as objective that of reducing the wear of the tyres or of increasing the run flat distance thereof, i.e. deflated with a lower pressure than the correct operating pressure, in particular if the tyre is of run flat type.

Tyres made according to the document WO2013190419 do not suggest solutions to the abovementioned problem.

The Applicant has however perceived that the abovementioned objectives can be solved by generating, between the tyre and the road, an additional lateral force which by being combined with the above-described lateral forces allow controlling the resultant of such lateral forces.

More precisely the Applicant has perceived that the reduction of the resultant of the lateral forces is made possible by the generation of said additional lateral force and by the possibility of controlling the magnitude thereof.

The Applicant has finally found that the above-indicated objectives can be obtained by means of an asymmetric profile capable of generating such additional lateral force which will be defined hereinbelow as "lateral conicity force".

In accordance with a first aspect, the present invention regards a method for controlling the rolling resistance of a running tyre.

The method comprising:
manufacturing a tyre, wherein the tyre has an asymmetric internal structure such to generate, between the tyre rotating in rectilinear running and the ground, a structural lateral force (known as Ply-Steer);
installing the tyre on a rim;
mounting a wheel on a vehicle, wherein the wheel comprises said tyre and said rim, wherein the wheel is mounted with a camber angle generating, between the tyre rotating in rectilinear running and the ground, a lateral camber force.

Preferably, manufacturing the tyre comprises:
obtaining an external profile of the tyre that is asymmetric with respect to a middle line plane of the tyre itself and configured for generating, between the tyre rotating in rectilinear running and the ground, a lateral conicity force;
conferring to the tyre said asymmetric external profile.

Preferably, one direction of the lateral conicity force is discordant with respect to one direction of the lateral camber force and wherein a modulus of the lateral conicity force is smaller than a modulus of the structural lateral force, so as to control a resulting lateral force comprising at least the lateral conicity force, the lateral camber force and the structural lateral force and to limit a rolling resistance of the running tyre on rectilinear trajectory.

In accordance with a second aspect, the present invention regards a method for reducing the consumption of a running vehicle, which comprises the execution of the method according to the preceding aspect and/or according to one or more of the aspects which will follow, applied to each of the wheels of the vehicle.

In accordance with a third aspect, the present invention regards a tyre for vehicle wheels.

Preferably, the tyre has an asymmetric internal structure; wherein, when a wheel, comprising said tyre installed on a rim is mounted on a vehicle with a camber angle, said camber angle generates, between the tyre rotating in rectilinear running and the ground, a lateral camber force and said asymmetric internal structure generates, between the tyre rotating in rectilinear running and the ground, a structural lateral force.

Preferably, the tyre has an external profile that is asymmetric with respect to a middle line plane of the tyre itself; wherein the asymmetric external profile is configured for generating, between the tyre rotating in rectilinear running and the ground, a lateral conicity force; wherein one direction of the lateral conicity force is discordant with respect to one direction of the lateral camber force and wherein a modulus of the lateral conicity force is smaller than a modulus of the structural lateral force, so as to control a resulting lateral force comprising at least the lateral conicity force, the lateral camber force and the structural lateral force and to limit a rolling resistance of the running tyre on rectilinear trajectory.

In accordance with a fourth aspect, the present invention regards an apparatus for vulcanising and moulding tyres for vehicle wheels.

Preferably, the apparatus comprises a vulcanisation mould internally delimiting, when the vulcanisation mould is closed, a vulcanisation and moulding cavity having a shape corresponding to an external shape to be conferred to a tyre once moulded and vulcanised.

Preferably, the apparatus comprises devices operatively associated with the vulcanisation and moulding cavity and configured for administering heat and pressure to the tyre contained in said vulcanisation and moulding cavity so as to vulcanise said tyre.

Preferably, a radial section of the vulcanisation and moulding cavity has an internal profile that is asymmetric with respect to a middle line plane of the vulcanisation and moulding cavity, in order to manufacture an asymmetric tyre in accordance with at least one of the preceding or following aspects.

The Applicant deems that the present invention allows controlling the rolling resistance of each tyre of a vehicle and hence also that part of resistance to advancement of the vehicle due to the interaction between the tyres and the road.

The Applicant deems that, through the asymmetric external profile suitably obtained for generating the lateral conicity force, it is possible to obtain said lateral conicity force and control the modulus thereof, and hence control the resulting lateral force which is the vectorial sum of said lateral conicity force and of at least one of the abovementioned lateral forces.

The Applicant deems that, through the asymmetric external profile and the lateral conicity force, it is possible to reduce the resulting lateral force of at least one of the tyres of the vehicle and/or reduce a mean of the resulting lateral forces acting on the tyres of the vehicle.

The Applicant deems that in this manner it is possible to lower the rolling resistance and consequently limit the wear and the overheating of the tyre or of the tyres of the vehicle, in particular when the tyre advances run flat, consequently the Applicant also deems that the present invention allows reducing the consumption or increasing the autonomy of the vehicle.

The present invention, in at least one of the aforesaid aspects, can have one or more of the preferred features that are described hereinbelow.

Preferably, the structural lateral force and the lateral camber force are given.

Preferably, the external profile is obtained in a manner such that the direction of the lateral conicity force is discordant with respect to the direction of the lateral camber force and the modulus of the lateral conicity force is lower than the modulus of the structural lateral force.

The Applicant observes that the structural lateral force (Ply-Steer) and the lateral camber force are given, in the sense that they are not controlled one by one but derive from the internal structure of the tyre, from the camber angle, from the vertical load, etc. The asymmetric profile is then designed and attained so as to generate the lateral conicity force such to control the resulting lateral force (vectorial sum of the lateral conicity force, of the lateral camber force and of the structural lateral force) and hence the rolling resistance.

Preferably, the asymmetric external profile comprises:
a first portion of external profile interposed between a radially outer surface of a tread band or of the tread band and an axially outer surface of a first sidewall of the tyre; and
a second portion of external profile interposed between a radially outer surface of the tread band and an axially outer surface of a second sidewall of the tyre.

Preferably, the first portion of external profile lies further from a rotation axis of the tyre and further from the middle line plane of the tyre with respect to the second portion of external profile.

Preferably, the first portion of external profile has a first curvature and the second portion of external profile has a second curvature, wherein the first curvature is greater than the second curvature.

Preferably, the lateral conicity force is comprised between 5% and 75% of the structural lateral force, more preferably between 10% and 65%.

Preferably, the lateral conicity force is comprised between 5% and 225% of the lateral camber force, more preferably between 10% and 195%.

Preferably, one direction of the lateral conicity force is discordant with respect to one direction of the lateral camber force.

Preferably, the wheel is mounted with a toe angle generating, between the tyre rotating in rectilinear running and the ground, a lateral toe force. Preferably, the asymmetric external profile is obtained as a function of the lateral toe force.

Preferably, one direction of the lateral conicity force is discordant with respect to one direction of the lateral toe force, so as to control said resulting lateral force also comprising said lateral toe force.

Preferably, the lateral conicity force is comprised between 5% and 225% of the lateral toe force, more preferably between 10% and 195%.

Preferably, the lateral conicity force is comprised between 10 N and 300 N.

Preferably, the asymmetric external profile is such that the direction of the lateral conicity force is discordant with respect to the direction of the lateral camber force and the modulus of the lateral conicity force is lower than the modulus of the structural lateral force.

Preferably, by virtually rotating a second radial half-section of the tyre on a first radial half-section of the tyre, the first portion of external profile and the second portion of external profile delimit a sickle shape between them.

Preferably, the sickle shape has a maximum thickness measured perpendicular with respect to a tangent to said first portion of external profile. Preferably, when the tyre is at an operating pressure, said maximum thickness is comprised between 2% and 33% of a curvature radius of the second portion of external profile at that point, more preferably between 4% and 20%.

Preferably, when the tyre is at the operating pressure, a radially outer and axially inner end of the sickle shape is situated between 60% and 90% of a half-width of the tyre, more preferably between 65% and 85%. Preferably, when the tyre is at the operating pressure, a radially outer and axially inner end of the sickle shape is situated between 95% and 99.5% of a middle line radius of the tyre, more preferably between 96% and 98.5%.

Preferably, when the tyre is at the operating pressure, a radially inner and axially outer end of the sickle shape is situated between 70% and 95% of a half-width of the tyre, more preferably between 75% and 90%.

Preferably, when the tyre is at the operating pressure, a radially inner and axially outer end of the sickle shape is situated between 85% and 97.5% of a middle line radius of the tyre, more preferably between 87.5% and 95%.

Preferably, when the tyre is at the operating pressure, the sickle shape is extended for a radial height comprised between 2% and 14.5% of a middle line radius of the tyre, more preferably between 3% and 12.5%. Preferably, when the tyre is at the operating pressure, the sickle shape is extended for an axial width comprised between 5% and 35% of a half-width of the tyre, more preferably between 10% and 25%.

Preferably, the tyre comprises a carcass structure provided with sidewall inserts and the sickle shape has a maximum thickness measured perpendicular with respect to a tangent to said first portion of external profile. Preferably, when the tyre is in run flat conditions, said maximum thickness is comprised between 2% and 33% of a curvature radius of the second portion of external profile at that point, more preferably between 4% and 25%.

Preferably, the tyre comprises a carcass structure provided with sidewall inserts, and, when the tyre is in run flat conditions, a radially outer and axially inner end of the sickle shape is situated between 60% and 90% of a half-width of the tyre, more preferably between 65% and 85%.

Preferably, a radially outer and axially inner end of the sickle shape is situated between 95% and 99.5% of a middle line radius of the tyre, more preferably between 96% and 98.5%.

Preferably, the tyre comprises a carcass structure provided with sidewall inserts, and, when the tyre is in run flat conditions, a radially inner and axially outer end of the sickle shape is situated between 70% and 95% of a half-width of the tyre, more preferably between 75% and 90%.

Preferably, a radially inner and axially outer end of the sickle shape is situated between 85% and 97.5% of a middle line radius of the tyre, more preferably between 87.5% and 95%.

Preferably, the tyre comprises a carcass structure provided with sidewall inserts, and, when the tyre is in run flat conditions, the sickle shape is extended for a radial height comprised between 2% and 14.5% of a middle line radius of the tyre, more preferably between 3% and 12.5%.

Preferably, the sickle shape is extended for an axial width comprised between 5% and 35% of a half-width of the tyre, more preferably between 10% and 25%.

Preferably, a central portion of the asymmetric external profile placed astride the middle line plane of the tyre is symmetric with respect to said middle line plane.

Preferably, when the tyre is at the operating pressure, said symmetric central portion has an axial width comprised between 60% and 90% of a width of the tyre, more preferably between 65% and 85%.

Preferably, when the tyre is in run flat conditions, said symmetric central portion has an axial width comprised between 60% and 90% of a width of the tyre, more preferably between 65% and 85%.

Preferably, the operating pressure is comprised between 50 kPa and 400 kPa, more preferably between 150 kPa and 300 kPa.

Preferably, the internal asymmetric profile of the radial section of the vulcanisation and moulding cavity is such to manufacture the asymmetric tyre in accordance with at least one of the preceding or following aspects.

Preferably, the internal asymmetric profile comprises a first portion of internal profile interposed between a surface arranged for operating against a tread band of a green tyre to be vulcanised and a first surface arranged for operating at least on a first sidewall of the green tyre.

Preferably, the internal asymmetric profile comprises a second portion of internal profile interposed between said surface arranged for operating against said tread band and a second surface arranged for operating at least on a second sidewall of the green tyre.

Preferably, the first portion of internal profile lies further from a central axis of the vulcanisation and moulding cavity and further from the middle line plane of the vulcanisation and moulding cavity with respect to the second portion of internal profile.

Preferably, the first portion of internal profile has a first curvature and the second portion of internal profile has a second curvature.

Preferably, the first curvature is greater than the second curvature.

Preferably, by virtually rotating a second radial half-section of the vulcanisation and moulding cavity on a first radial half-section of the vulcanisation and moulding cavity, the first portion of internal profile and the second portion of internal profile delimit a sickle shape between them.

Preferably, the sickle shape has a maximum thickness measured perpendicular with respect to a tangent to said first portion of internal profile.

Preferably, said maximum thickness is comprised between 2% and 33% of a curvature radius of the second portion of internal profile at that point, more preferably between 4% and 25%.

Preferably, a radially outer and axially inner end of the sickle shape is situated between 60% and 90% of a half-width of the vulcanisation and moulding cavity, more preferably between 65% and 85%.

Preferably, a radially outer and axially inner end of the sickle shape is situated between 95% and 99.5% of a middle line radius of the vulcanisation and moulding cavity, more preferably between 96% and 98.5%.

Preferably, a radially inner and axially outer end of the sickle shape is situated between 70% and 95% of a half-width of the vulcanisation and moulding cavity, more preferably between 75% and 90%.

Preferably, a radially inner and axially outer end of the sickle shape is situated between 85% and 97.5% of a middle line radius of the vulcanisation and moulding cavity, more preferably between 87.5% and 95%.

Preferably, the sickle shape is extended for a radial height comprised between 2% and 14.5% of a middle line radius of the vulcanisation and moulding cavity, more preferably between 3% and 12.5%.

Preferably, the sickle shape is extended for an axial width comprised between 5% and 35% of a half-width of the vulcanisation and moulding cavity, more preferably between 10% and 25%.

Preferably, the tyre comprises a carcass structure, a belt structure applied around the carcass structure and a tread band superimposed on the belt structure.

Preferably, the carcass structure comprises at least one carcass ply having terminal flaps engaged with respective anchoring annular structures.

Preferably, the belt structure comprises one or more belt layers.

Preferably, the belt layers are situated in radial superimposition with respect to each other and with respect to the carcass structure having metallic or textile reinforcement cords with cross orientation and/or substantially parallel to a circumferential extension direction of the tyre.

Preferably, respective sidewalls made of elastomeric material are also applied on lateral surfaces of the carcass structure, each extended from one of the lateral edges of the tread band up to a respective anchoring annular structure to the beads.

Preferably, the structural lateral force (Ply-Steer) is due to internal asymmetries of the carcass structure and/or of the belt structure. The direction of such structural lateral force depends on the rotation sense of the tyre.

Preferably, the structural lateral force (Ply-Steer) is due to the belt layers arranged at different radial distances from the rotation axis and having reinforcement cords with cross orientation.

Further characteristics and advantages will be clearer from the detailed description of a method for controlling the rolling resistance of a running tyre, of a method for reducing the consumption of a running vehicle, of a tyre for vehicle wheels and of an apparatus for vulcanising and moulding tyres for vehicle wheels, according to the present invention.

DESCRIPTION OF THE DRAWINGS

Such description will be set forth hereinbelow with reference to the enclosed drawings, provided only as a non-limiting example in which:

FIGS. 3, 4 and 5 illustrate respective front views of a portion of a tyre provided with the profile pursuant to FIGS. 1 and 2 mounted on a vehicle in respective geometric configurations;

FIG. 6 illustrates a top view of a vehicle provided with tyres according to the invention;

DETAILED DESCRIPTION

Figure 1:
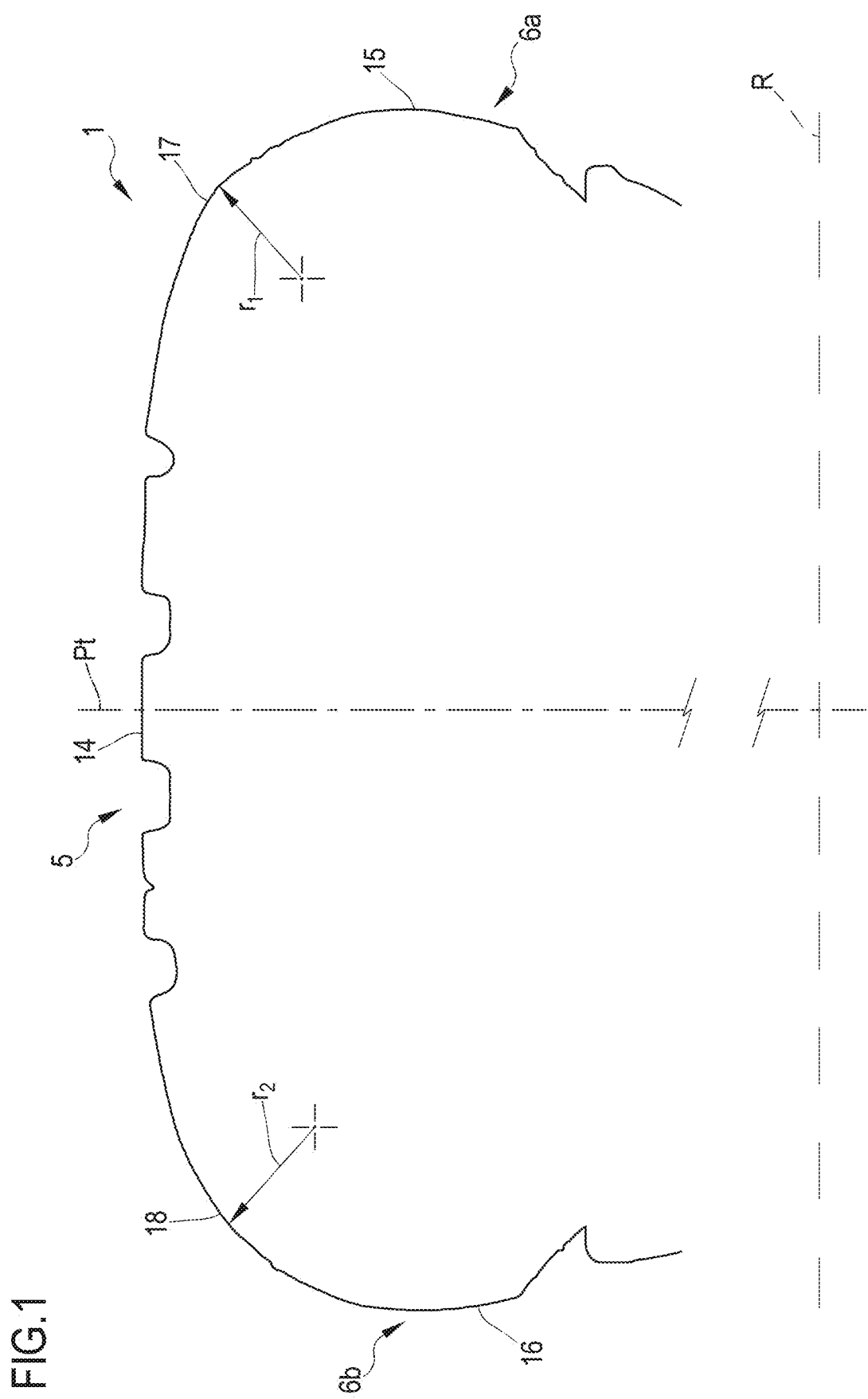
FIG. 1 shows a profile of a tyre according to the present invention configured for actuating the methods of the present invention.

Illustrated in FIG. 1 is an external profile 1 of a tyre 2 for vehicle wheels obtained by sectioning a radially outer surface of the tyre 2 with a radial plane.

Figure 9:
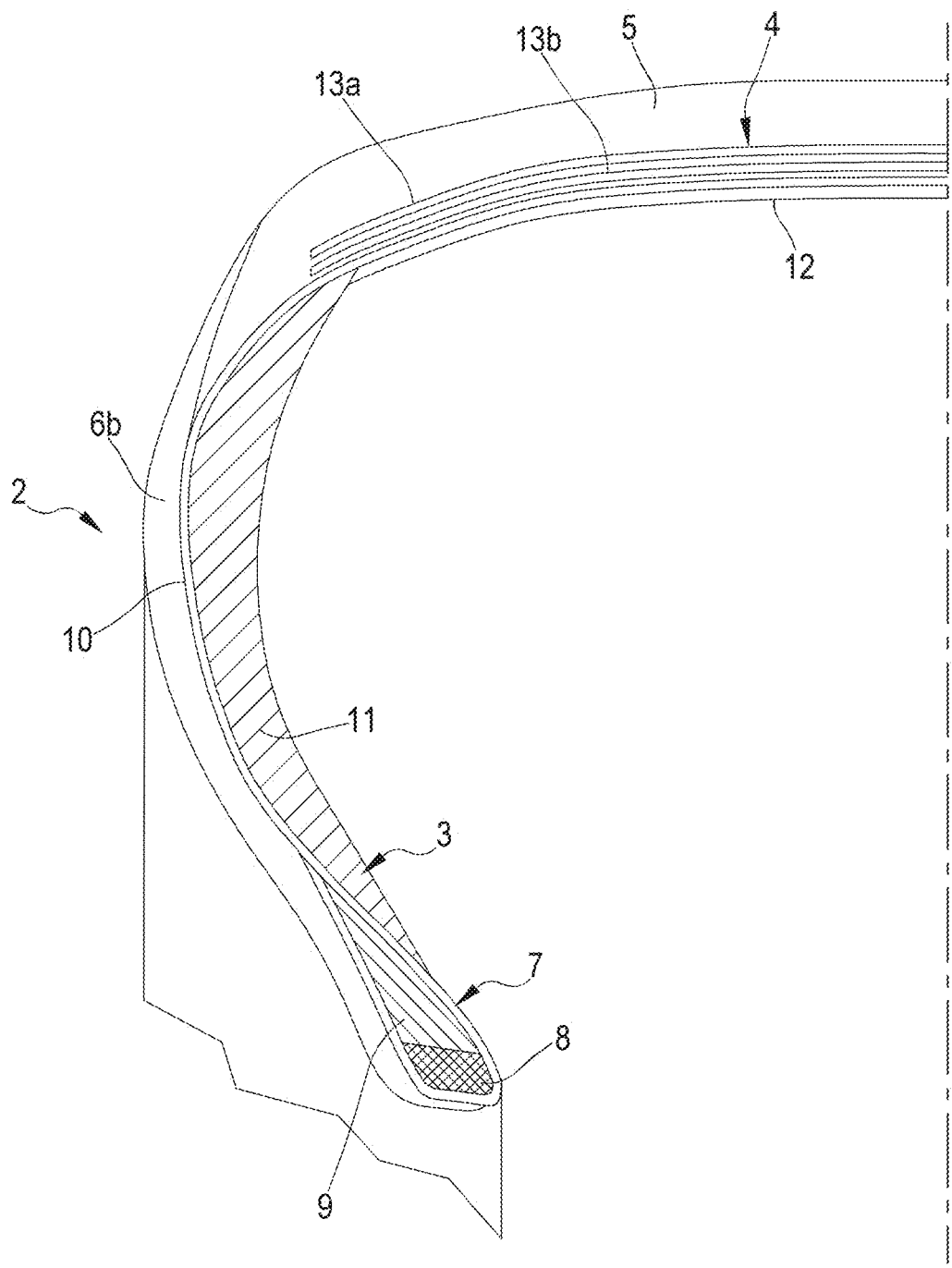
FIG. 9 illustrates a radial half-section of a tyre for vehicle wheels provided with the profile of FIG. 1.

A non-limiting example of the internal structure of the tyre 2 for vehicle wheels is illustrated in FIG. 9. The tyre 2 comprises a carcass structure 3, comprising at least one carcass ply 10 having respectively-opposite terminal flaps engaged with respective anchoring annular structures 8, termed bead cores, possibly associated with a filler insert 9. The zone of the tyre 2 comprising the bead core 8 and the filler insert 9 forms a bead structure 7 intended for anchoring the tyre 2 on a corresponding mounting rim, not illustrated.

The carcass structure 10 is associated with a belt structure 4 comprising one or more belt layers 13*a*, 13*b* situated in radial superimposition with respect to each other and with respect to the carcass ply 10, having metallic or textile reinforcement cords with cross orientation and/or substantially parallel to a circumferential extension direction of the tyre 2.

In radially outer position with respect to the belt structure 4, a tread band 5 made of elastomeric compound is applied, like other semifinished products constituting the tyre 2. Respective sidewalls 6a, 6b made of elastomeric compound are also applied on the lateral surfaces of the carcass structure 3, each extended from one of the lateral edges of the tread 5 up to the respective bead structure 7, in axially outer position.

A rubber layer 12, generally known as "liner", which provides the necessary impermeability to the inflation air of the tyre 2, is arranged in a radially inner position with respect to the carcass ply 10.

The tyre 2 of FIG. 9 is of run flat type, i.e. of the type built for allowing the running in acceptable safety conditions even when the tyre 2 is partially or completely deflated. For such purpose, the carcass structure 3 comprises sidewall inserts 11 (i.e. annular reinforcement inserts made of elastomeric material), applied in internal position at the carcass ply 10 and at the sidewalls 6a, 6b. The sidewall inserts 11 are capable of sustaining the loads transmitted between the belt structure 4 and the anchoring annular structures 7 when the tyre 2, e.g. punctured, is required to work when partially or completely deflated.

Even if in the FIG. 9 it is not illustrated, the external profile 1 of the tyre 2 is that of FIG. 1.

Figure 3:
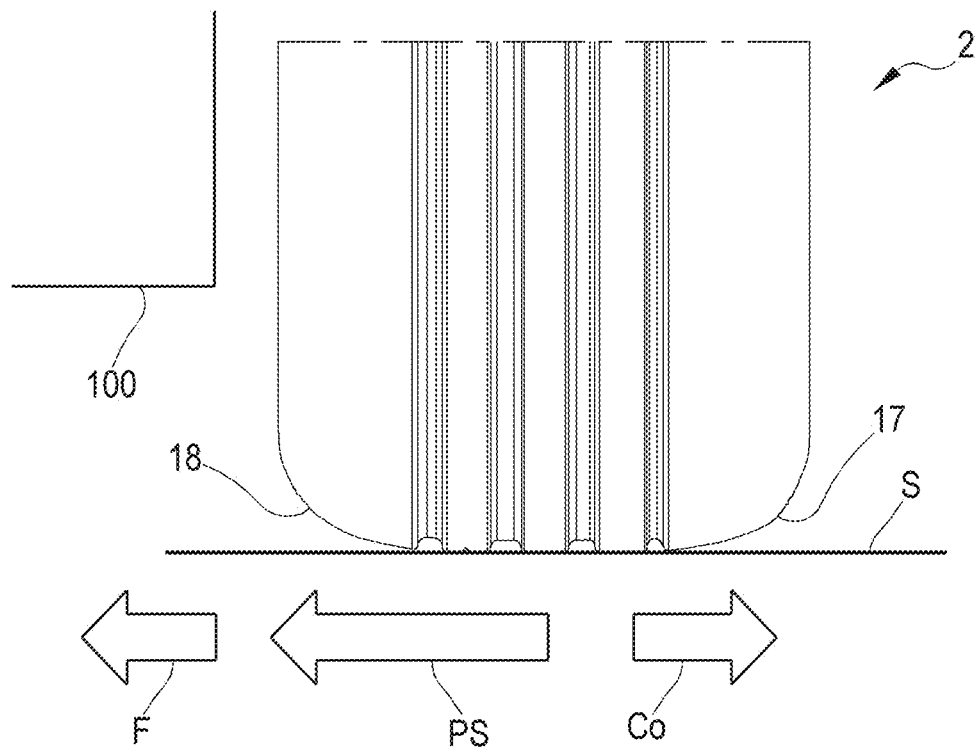
Figure 4:
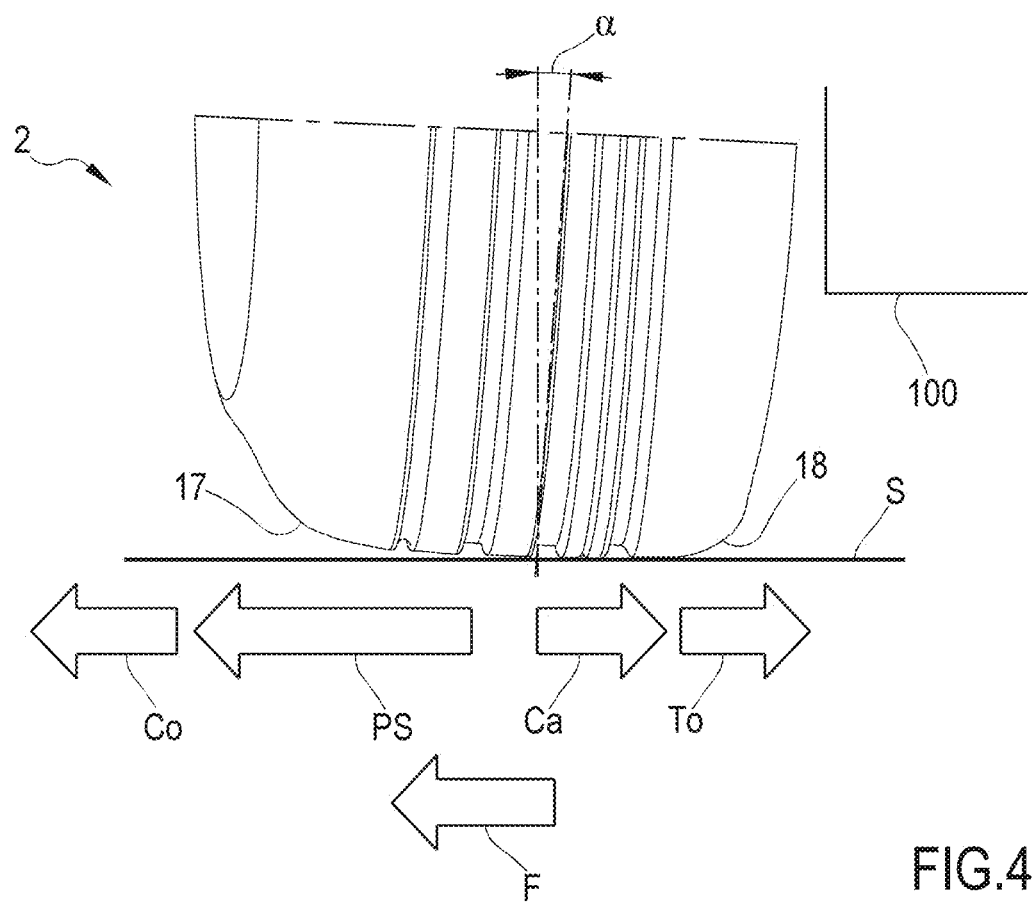

The external profile 1 is asymmetric with respect to a middle line plane "Pt" of the tyre 2, in order to generate, between the tyre 2 rotating in rectilinear running and the ground "S", a lateral conicity force "Co" (illustrated in FIGS. 3, 4 and 5).

Figure 2:
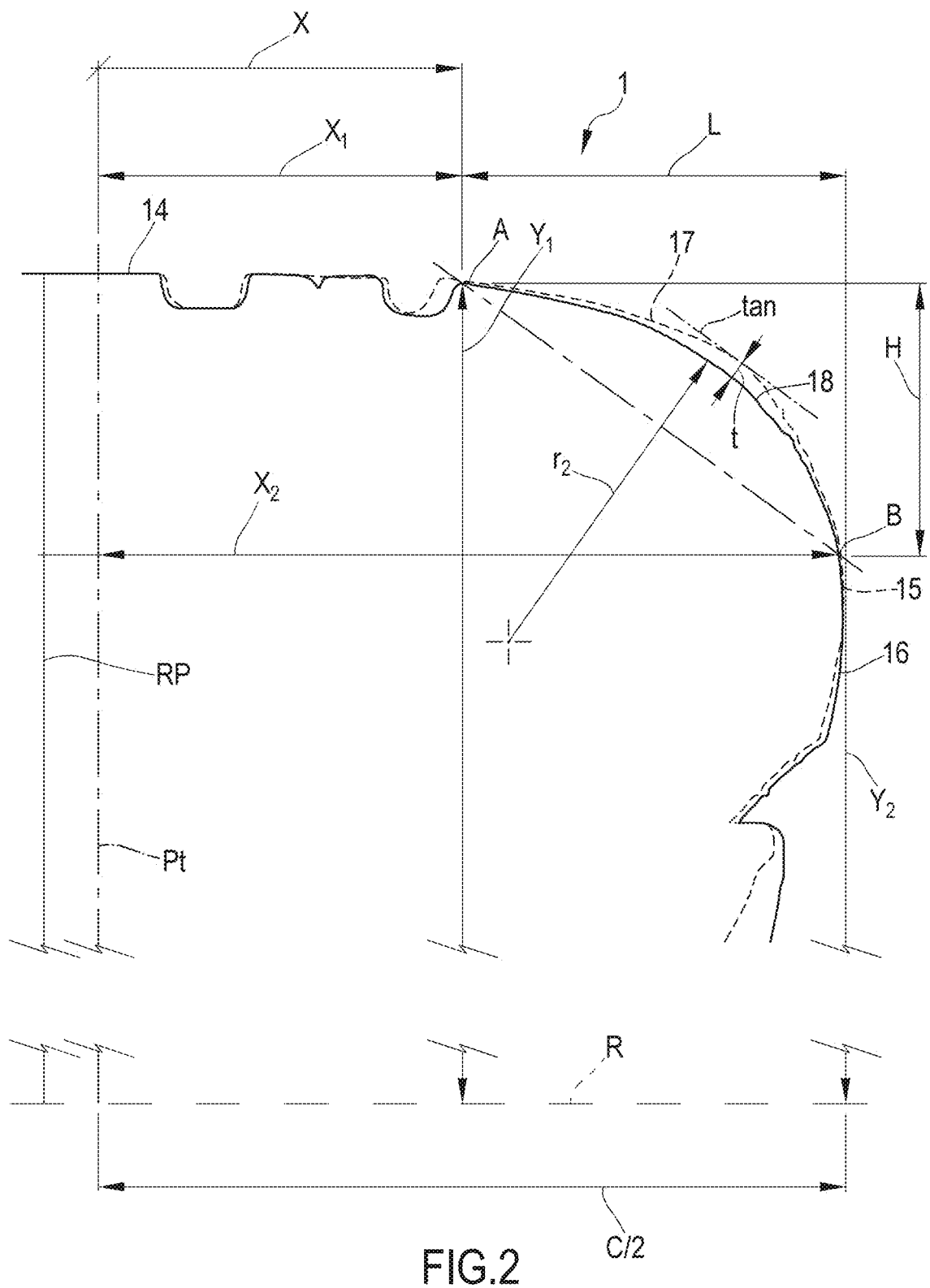
FIG. 2 is a virtual superimposition of one half of the profile of FIG. 1 on the other half of the same profile.

As is visible in FIGS. 1 and 2 (by means of virtual superimposition of a left half of the external profile 1 of FIG. 1 on the right half of the same external profile 1, a second radial half-section of the tyre 2 is obtained on a first radial half-section of the tyre 2), the external profile 1 comprises a central portion 14 placed astride the middle line plane "Pt". Such central portion 14 corresponds with a radially more external surface of the tread band 5 and is substantially symmetric with respect to the middle line plane "Pt". More precisely, the central portion 14 is strictly symmetric on condition that the sections corresponding with the longitudinal slots are substituted with circular arcs corresponding with the curvature radius at the two sides of the nearly vertical walls of the slots.

The external profile 1 comprises a first lateral portion 15 and a second lateral portion 16 which correspond with axially outer surfaces of a first sidewall 6a and of a second sidewall 6b of the tyre 2.

The external profile 1 comprises a first portion 17 of external profile interposed between the central portion 14 and the first lateral portion 15 and a second portion 18 of external profile interposed between the central portion 14 and the second lateral portion 16.

As is better visible in FIG. 2, the first portion 17 of external profile lies further from a rotation axis "R" of the tyre 2 and further from the middle line plane "Pt" of the tyre 2 with respect to the second portion 18 of external profile. In addition, the first portion 17 of external profile has a first curvature "1/r1" and the second portion of external profile has a second curvature "1/r2" and the first curvature is greater than the second curvature.

In the virtual superimposition of FIG. 2, the first portion 17 of external profile and the second portion 18 of external profile delimit a sickle shape between them.

The sickle shape has a radially outer and axially inner end "A" and a radially inner and axially outer end "B" and a maximum thickness "t" measured perpendicular with respect to a tangent "tan" to said first portion 17 of external profile.

The radially outer and axially inner end "A" is situated at a first axial distance "X1" from the middle line plane "Pt" and at a first radial distance "Y1" from the rotation axis "R". The radially inner and axially outer end "B" is situated at a second axial distance "X2" from the middle line plane "Pt" and at a second radial distance "Y2" from the rotation axis "R". In addition, the sickle shape is extended for a radial height "H" and for an axial width "L".

The dimensions and the position of the sickle shape and hence the asymmetry of the tyre 2 can vary as a function of the pressure at which the tyre 2 is inflated.

When the tyre 2 is at an operating pressure, for example comprised between 50 kPa and 400 kPa, the maximum thickness "t" as defined above is comprised between 2% and 33% of a curvature radius "r2" of the second portion 18 of external profile at that point, i.e. at the point where the maximum thickness "t" is measured, the first axial distance "X1" is comprised between 60% and 90% of a half-width "C/2" of the tyre 2, the first radial distance "Y1" is comprised between 95% and 99.5% of a middle line radius "RP" of the tyre 2, the second axial distance "X2" is comprised between 70% and 95% of the half-width "C/2" of the tyre 2, the second radial distance "Y2" is comprised between 85% and 97.5% of a middle line radius "RP" of the tyre 2, the radial height "H" is comprised between 2% and 14.5% of the middle line radius "RP" of the tyre 2 and the axial width "L" is comprised between 5% and 35% of the half-width "C/2" of the tyre 2. In addition, at the abovementioned operating pressure, the symmetric central portion 14 has an axial width "X" comprised between 60% and 90% of a width of the tyre 2.

When the illustrated tyre 2, which is of run flat type since provided with sidewall inserts 11, is in run flat conditions, i.e. the internal pressure of the tyre 2 is substantially equal to the external atmospheric pressure, the maximum thickness "t" as defined above is comprised between 2% and 33% of a curvature radius "r2" of the second portion 18 of external profile at that point, i.e. at the point where the maximum thickness "t" is measured, the first axial distance "X1" is comprised between 60% and 90% of a half-width "C/2" of the tyre 2, the first radial distance "Y1" is comprised between 95% and 99.5% of a middle line radius "RP" of the tyre 2, the second axial distance "X2" is comprised between 70% and 95% of the half-width "C/2" of the tyre 2, the second radial distance "Y2" is comprised between 85% and 97.5% of a middle line radius "RC" of the tyre 2, the radial height "H" is comprised between 2% and 14.5% of the middle line radius "RP" of the tyre 2 and the axial width "L" is comprised between 5% and 35% of the half-width "C/2" of the tyre 2. In addition, in run flat conditions, the symmetric central portion 14 has an axial width "X" comprised between 60% and 90% of a width of the tyre 2.

Figure 7:
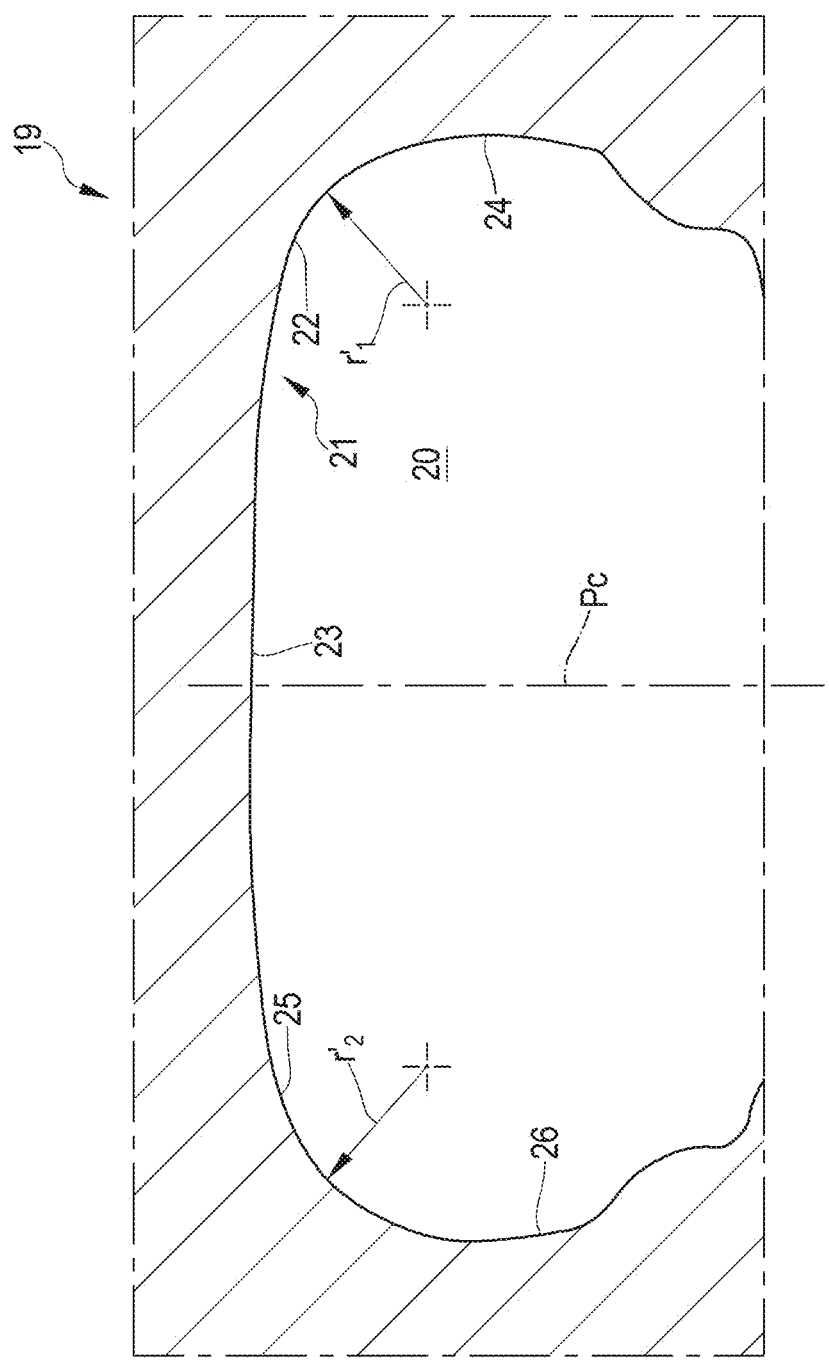
FIG. 7 is a radial and partial section of a vulcanisation and moulding cavity of an apparatus for vulcanising and moulding tyres for vehicle wheels according to the present invention.
Figure 8:
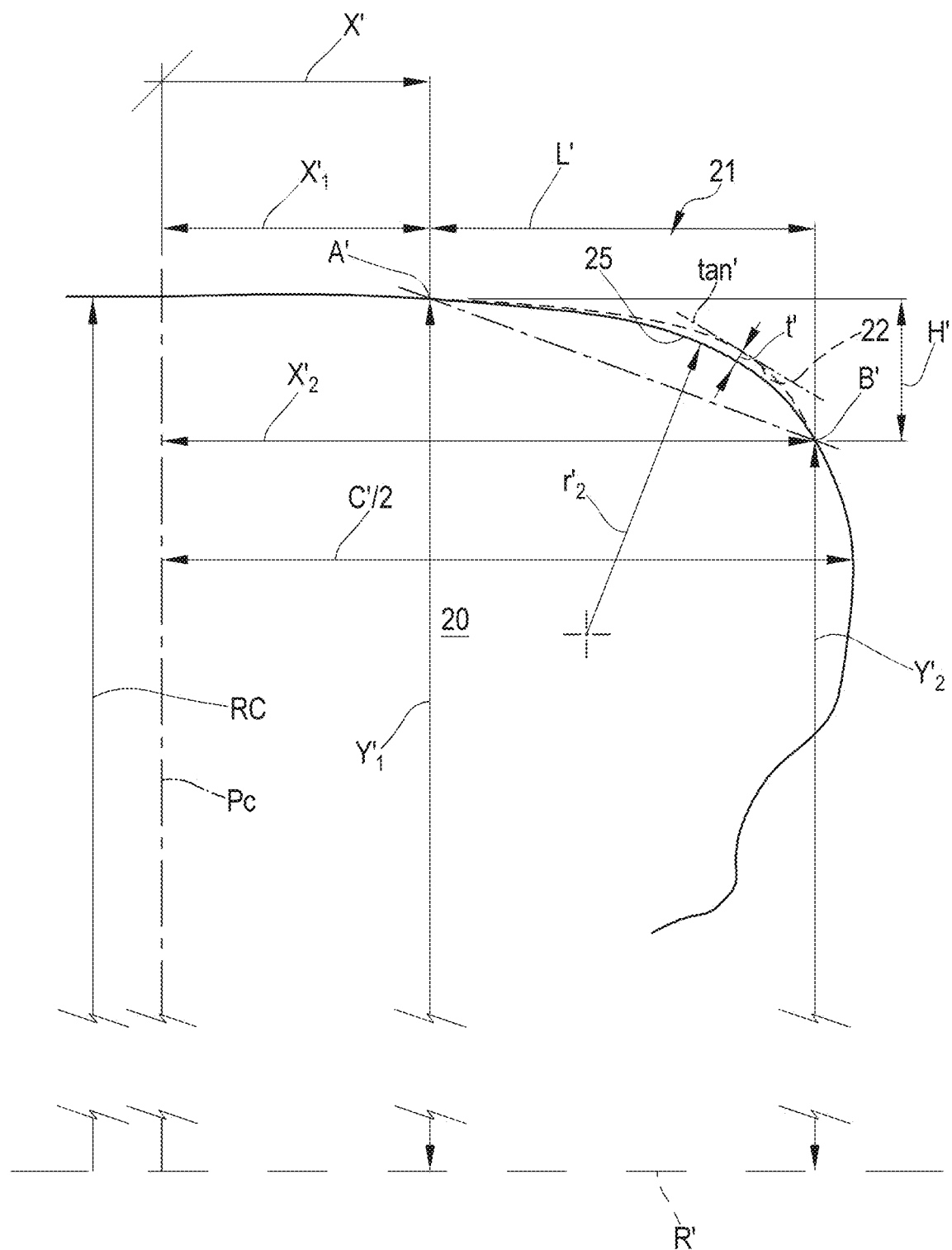
FIG. 8 is a virtual superimposition of one half of the vulcanisation and moulding cavity 1 of FIG. 7 on the other half of the same cavity.

In order to obtain the illustrated asymmetric tyre 2, i.e. in order to confer to the tyre 2 the asymmetric external profile 1, such tyre 2 is moulded and vulcanised in an asymmetric vulcanisation mould 19 schematically illustrated in FIGS. 7 and 8 and belonging to an apparatus, not illustrated, for vulcanising and moulding tyres for vehicle wheels.

The vulcanisation mould 19 internally delimits, when closed, a vulcanisation and moulding cavity 20 having a shape corresponding to an external shape to be conferred to the tyre 2 once moulded and vulcanised. Devices operatively associated with the vulcanisation and moulding cavity 20 are configured for administering heat and pressure to the tyre 2 contained in said vulcanisation and moulding cavity 20 so as to vulcanise said tyre 2.

As is visible in FIGS. 7 and 8, a radial section of the vulcanisation and moulding cavity 20 has an internal profile 21 that is asymmetric with respect to a middle line plane "Pc'" of the vulcanisation and moulding cavity 20 itself, in order to manufacture the asymmetric tyre 2. The internal asymmetric profile 21 of the vulcanisation and moulding cavity 20 is similar to the external profile 1 of the tyre 2.

The internal asymmetric profile 21 comprises a first portion 22 of internal profile interposed between a surface 23 arranged for operating against the tread band 5 of a green tyre 2 to be vulcanised and a first surface 24 arranged for operating at least on a first sidewall 6a of the green tyre 2 and a second portion 25 of internal profile interposed between said surface 23 arranged for operating against said tread band 5 and a second surface 26 arranged for operating at least on a second sidewall 6b of the green tyre 2.

As is better visible in FIG. 8, the first portion 22 of internal profile lies further from a central axis "R'" of the vulcanisation and moulding cavity 20 and further from the middle line plane "Pc" of the vulcanisation and moulding cavity 20 with respect to the second portion 25 of internal profile. In addition, the first portion 22 of internal profile has a first curvature "1/r'1" and the second portion 25 of internal profile has a second curvature "1/r'2" and the first curvature is greater than the second curvature.

In virtual superimposition of FIG. 8, the first portion 22 of internal profile and the second portion 25 of internal profile delimit a sickle shape between them. The sickle shape delimited by the internal profiles of the vulcanisation and moulding cavity 20 has a radially outer and axially inner end "A'" and a radially inner and axially outer end "B'" and a maximum thickness "t'" measured perpendicular with respect to a tangent "tan'" to said first portion 22 of internal profile.

The radially outer and axially inner end "A'" is situated at a first axial distance "X'1" from the middle line plane "Pc'" and at a first radial distance "Y'1" from the central axis "R'". The radially inner and axially outer end "B'" is situated at a second axial distance "X'2" from the middle line plane "Pc'" and at a second radial distance "Y'2" from the central axis "R'". In addition, the sickle shape is extended for a radial height "H'" and for an axial width "L'".

The maximum thickness "t'" as defined above is comprised between 2% and 33% of a curvature radius "r'2" of the second portion 25 of external profile at that point, i.e. at the point where the maximum thickness "t'" is measured, the first axial distance "X'1" is comprised between 60% and 90% of a half-width "C'/2" of the vulcanisation and moulding cavity 20, the first radial distance "Y'1" is comprised between 95% and 99.5% of a middle line radius "RC" of the vulcanisation and moulding cavity 20, the second axial distance "X'2" is comprised between 70% and 95% of the half-width "C'/2" of the vulcanisation and moulding cavity 20, the second radial distance "Y'2" is comprised between 85% and 97.5% of the middle line radius "RC" of the vulcanisation and moulding cavity 20, the radial height "H'" is comprised between 2% and 14.5% of the middle line radius "RC" of the vulcanisation and moulding cavity 20 and the axial width "L'" is comprised between 5% and 35% of the half-width "C'/2" of the vulcanisation and moulding cavity 20. In addition, the symmetric central portion 23 has an axial width "X'" comprised between 60% and 90% of a width "C'" of the vulcanisation and moulding cavity 20.

The above-described geometry of the internal profile 21 of the vulcanisation and moulding cavity 20 is attained as a function of the geometry to be conferred to the external profile 1 of the tyre 2.

The present invention also relates to a method for controlling the rolling resistance of a running tyre 2 and to a method for reducing the consumption of a running vehicle 100.

In accordance with the methods according to the present invention, the external profile 1 of the tyre 2 is designed and attained in order to obtain the abovementioned lateral conicity force "Co". For example, the asymmetric external profile 1 is calculated and manufactured in order to obtain a lateral conicity force "Co" such to control a resulting lateral force "F" exchanged between the ground "S" and the tyre 2 running on rectilinear trajectory.

Once the internal geometry of the tyre 2 and the geometry according to which each tyre 2 is mounted on a vehicle 100 are known, the following forces of interaction between each tyre 2 and the ground "S" can be measured or calculated:
To lateral toe force;
Ca lateral camber force;
PS structural lateral force.

The lateral toe force "To" depends on the toe angle "B" according to which each tyre 2 is mounted on the vehicle 100. The lateral camber force "Ca" depends on the camber angle "a" according to which each tyre 2 is mounted on the vehicle 100. The structural lateral force "PS" depends on the asymmetric internal structure of the tyre 2, e.g. from asymmetries in the carcass structure 3 and/or in the belt structure 4, and is directed in one sense or in that opposite as a function of the rotation sense of the tyre 2 itself. Typically, the structural lateral force "PS" is due to the belt layers 13a, 13b arranged at different radial distances from the rotation axis "R" and having reinforcement cords with cross orientation.

The resulting lateral force "F" comprises at least the lateral conicity force "Co", the lateral camber force "Ca" and the structural lateral force "PS".

Once the "ranges" of the abovementioned forces are known for each wheel, the external profile 1 of the tyre 2 is designed and attained for obtaining a value of the lateral conicity force "Co" that can modify the resultant of the lateral forces so as to obtain a resulting lateral force "F" that will be different for each wheel.

The possibility of verifying and/or setting beforehand the resultant of the lateral forces that act between each tyre 2 and the road allows controlling the rolling resistance of each tyre 2 and also of reducing the consumption of the running vehicle 100.

By way of example, FIG. 3 illustrates a wheel (with rim and tyre 2) mounted on the vehicle 100 with toe angle and with camber equal to 0° so that the only two lateral forces present are the structural lateral force "PS" and the lateral conicity force "Co" directed in opposite senses, so that the lateral conicity force "Co" partially balances the structural lateral force "PS". In the tyre 2 of FIG. 3, the second portion 18 of external profile is placed on the left and the first portion 17 is placed on the right. The structural lateral force "PS" is directed towards the vehicle 100 (placed on the left in FIG. 3) while the lateral conicity force "Co" is directed towards the opposite side with respect to the vehicle 100. For example, if the lateral conicity force "Co" is equal to about 50% of the structural lateral force "PS" (e.g.: PS=400 N and Co=200 N), the resulting lateral force "F" is directed towards the vehicle 100 and has a value of about 200 N.

By way of example, FIG. 4 illustrates a wheel (with rim and tyre 2), right front when seen frontally, mounted on the vehicle 100 with toe angle and with camber angle that are non-zero and precisely positive as toe and negative as camber, so that all the lateral forces are present. In the tyre 2 of FIG. 4, the second portion 18 of external profile is placed on the right and the first portion 17 is placed on the left. The toe "To" and camber "Ca" are directed towards the vehicle 100 (on the right in FIG. 4) while the structural lateral forces "PS" and conicity "Co" lateral forces are directed in opposite direction, i.e. on the opposite side with respect to the vehicle 100. The toe "To" and camber "Ca" lateral forces and the structural "PS" and conicity "Co" lateral forces partially balance themselves. For example, if the lateral conicity force "Co" is equal to about 40% of the structural lateral force "PS" (e.g.: PS=350 N and Co=140 N), the lateral toe "To" and camber "Ca" forces are each equal to about 30% of the structural lateral force "PS" (e.g.: To=Ca=105 N; the lateral conicity force "Co" is equal to about 135% of the lateral camber force "Ca"), the resulting lateral force "F" is directed on the opposite side with respect to the vehicle 100 and has a value of about 280 N.

By way of example, FIG. 5 illustrates a wheel (with rim and tyre 2), left front when seen frontally, mounted on the vehicle 100 with toe angle and camber angle that are non-zero and precisely positive as toe and negative as camber, so that all the lateral forces are present. In the tyre 2 of FIG. 5, the second portion 18 of external profile is placed on the left and the first portion 17 is placed on the right. The structural "PS", toe "To" and camber "Ca" lateral forces are directed towards the vehicle 100 (on the left in FIG. 5) while the lateral conicity force "Co" is directed in the opposite direction, i.e. on the opposite side with respect to the vehicle 100. For example, if the lateral conicity force "Co" is equal to about 40% of the structural lateral force "PS" (e.g.: PS=350 N and Co=140 N), the lateral toe force "To" is equal to about 50% of the structural lateral force "PS" (To=175 N) and the lateral camber force "Ca" is equal to about 30% of the structural lateral force "PS" (e.g.: Ca=105 N), the resulting lateral force "F" is directed towards the vehicle 100 and has a value of about 490 N.

By way of example, FIG. 6 illustrates the vehicle 100 with the indication of the lateral forces that act on each wheel. The toe "To" and camber "Ca" lateral forces are internally directed towards the vehicle 100. The lateral conicity forces "Co" are directed outwards. The structural lateral forces "PS" are all directed on the same side because the tyres 2 of one side rotate in an opposite direction with respect to those of the other side.

Given the same other conditions (such as the vertical load which acts on the wheel, the inflation pressure of the tyre etc.), the rolling resistance "Rt" in rectilinear running of a tyre 2 increases with the resulting lateral force "F" exchanged between the ground "S" and the tyre 2 and the rolling resistance "Rv" of the vehicle 100 is the sum of the rolling resistances "Rt" of each tyre 2.

The generation of the lateral conicity forces "Co" allows reducing the rolling resistance "Rv" of the vehicle 100 (or the mean rolling resistance of each tyre 2 intended as rolling resistance "Rv" of the vehicle 100 divided by the number of wheels) and, consequently, the consumption of the running vehicle 100, because on some tyres (those of the left wheels in FIG. 6) the lateral conicity force "Co" reduces the resulting lateral force "F".

The following tables contain values referred to simulated tests carried out with one vehicle equipped with reference tyres A and the other with a vehicle with tyres according to the invention B.

Tyres A

External symmetric profile that does not generate any lateral conicity force (Co=0).

Asymmetric internal structure which generates the structural lateral force (PS).

Such tyres are mounted on the vehicle, as in FIG. 6, with camber angles which generate the lateral camber forces (Ca) and toe angles that generate the toe lateral forces (To).

Tyres B

Asymmetric external profile (according to the invention) which generates the lateral conicity force (Co).

Such tyres B have the same internal structure of the tyres A and are mounted on the same vehicle (same vertical loads on the wheels) with the same camber angles and toe angles of the tyres A.

The inflation pressure for both tyres A and B is 2.2 bar.

The values RR % in the final column on the right are normalised at the RR in conditions of equal vertical load and pressure but with zero toe and camber angles. Hence by placing at 100 the RRref (penultimate column on the right) both of the tyres A and of the tyres B with zero toe and camber, the expected RR % are reported at the four wheels at the camber and toe conditions in rectilinear running (last column on the right).

| | Tyres A | | | | | | | |
|---|---|---|---|---|---|---|---|---|
| Wheel | Vertical load (N) | PS (N) | Ca (N) | To (N) | Co (N) | Tot (N) | RRref | RR % |
| FL | 4300 | 245 | 50 | 81 | 0 | 376 | 100 | 103.01 |
| FR | 4300 | 245 | −50 | −81 | 0 | 114 | 100 | 100.02 |
| RL | 4350 | 245 | 141 | 194 | 0 | 580 | 100 | 108.39 |
| RR | 4350 | 245 | −141 | −194 | 0 | −90 | 100 | 99.64 |
| | | | | | | mean RR % | | 102.77 |

| | Tyres B | | | | | | | |
|---|---|---|---|---|---|---|---|---|
| Wheel | Vertical load (N) | PS (N) | Ca (N) | To (N) | Co (N) | Tot (N) | RR % ref | RR % |
| FL | 4300 | 240 | 45 | 84 | −48 | 321 | 100 | 100.50 |
| FR | 4300 | 240 | −45 | −84 | 48 | 159 | 100 | 100.70 |
| RL | 4350 | 240 | 135 | 198 | −48 | 525 | 100 | 104.13 |
| RR | 4350 | 240 | −135 | −198 | 48 | −45 | 100 | 96.29 |
| | | | | | | mean RR % | | 100.41 |

As can be observed, on the wheels FL, RL, RR the sum of the lateral forces and hence the variation of RR % (with respect to the conditions with zero toe and camber angles) is lower for the tyres B with conical profile according to the invention with respect to the tyres A.

Only at the right front wheel FR the sum of the lateral forces is higher in absolute value in the case B and consequently there is a greater increase of RR %.

On the other three wheels the sum of the lateral forces for the tyres B is always lower in absolute value with respect to the tyres A and, consequently, the variations RR % are favourable, i.e. lower.

It follows that the variation of mean RR % is lower for the tyres B (100.41) with conical profile with respect to the tyres A (102.77) and hence the tyres B according to the invention allow obtaining the objectives indicated in the present description.

The invention claimed is:

1. A method for controlling a rolling resistance of a running tyre, the method comprising:

manufacturing a tyre, wherein the tyre has an asymmetric internal structure configured to generate, between the tyre rotating in rectilinear running and ground, a structural lateral force;

installing the tyre on a rim;

mounting a wheel on a vehicle, wherein the wheel comprises said tyre and said rim, wherein the wheel is mounted with a camber angle configured to generate, between the tyre rotating in rectilinear running and the ground, a lateral camber force, wherein manufacturing the tyre comprises:

obtaining an asymmetric external profile of the tyre that is asymmetric with respect to a middle line plane of the tyre and configured to generate, between the tyre rotating in rectilinear running and the ground, a lateral conicity force; and conferring, to the tyre, said asymmetric external profile, wherein one direction of the lateral conicity force is discordant with respect to one direction of the lateral camber force and wherein a modulus of the lateral conicity force is smaller than a modulus of the structural lateral force, so as to control a resulting lateral force comprising at least the lateral conicity force, the lateral camber force and the structural lateral force and to limit a rolling resistance of the tyre running on rectilinear trajectory.

2. The method according to claim 1, wherein the asymmetric external profile comprises:

a first portion of external profile interposed between a radially outer surface of a tread band and an axially outer surface of a first sidewall of the tyre; and a second portion of external profile interposed between a radially outer surface of the tread band and an axially outer surface of a second sidewall of the tyre, wherein the first portion of external profile lies further from a rotation axis of the tyre and further from the middle line plane of the tyre with respect to the second portion of external profile; and wherein the first portion of external profile has a first curvature and the second portion of external profile has a second curvature, wherein the first curvature is greater than the second curvature.

3. The method according to claim 2, wherein the lateral conicity force is comprised between 5% and 75% of the structural lateral force.

4. The method according to claim 3, wherein the lateral conicity force is comprised between 5% and 225% of the lateral camber force.

5. The method according to claim 4, wherein the wheel is mounted with a toe angle configured to generate, between the tyre rotating in rectilinear running and the ground, a lateral toe force.

6. The method according to claim 5, wherein one direction of the lateral conicity force is discordant with respect to a direction of the lateral toe force, so as to control said resulting lateral force also comprising said lateral toe force.

7. The method according to claim 6, wherein the lateral conicity force is comprised between 5% and 225% of the lateral toe force.

8. A method for reducing consumption of a running vehicle, the method comprising:

performing the method according to claim 7 with respect to each of the wheels of the vehicle.

* * * * *